(12) United States Patent
Sun et al.

(10) Patent No.: US 11,777,668 B2
(45) Date of Patent: Oct. 3, 2023

(54) METHOD AND APPARATUS FOR DEVICE-TO-DEVICE COMMUNICATION BASED ON A THRESHOLD

(71) Applicant: LENOVO (BEIJING) LIMITED, Beijing (CN)

(72) Inventors: Zhennian Sun, Beijing (CN); Xiaodong Yu, Beijing (CN); Haipeng Lei, Beijing (CN); Lianhai Wu, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 42 days.

(21) Appl. No.: 17/276,130

(22) PCT Filed: Sep. 27, 2018

(86) PCT No.: PCT/CN2018/108047
§ 371 (c)(1),
(2) Date: Mar. 13, 2021

(87) PCT Pub. No.: WO2020/061934
PCT Pub. Date: Apr. 2, 2020

(65) Prior Publication Data
US 2022/0052800 A1 Feb. 17, 2022

(51) Int. Cl.
*H04L 1/18* (2023.01)
*H04L 1/1867* (2023.01)
(Continued)

(52) U.S. Cl.
CPC ......... *H04L 1/1867* (2013.01); *H04B 7/0695* (2013.01); *H04L 1/1861* (2013.01);
(Continued)

(58) Field of Classification Search
CPC .......... H04L 1/1867; H04L 2001/0093; H04L 2001/0097; H04L 1/1861; H04B 7/0695
See application file for complete search history.

(56) References Cited

U.S. PATENT DOCUMENTS 10,986,609 B2 * 4/2021 Lei .................. H04L 5/0053
11,304,039 B2 * 4/2022 Basu Mallick ....... H04L 1/1819
(Continued)

FOREIGN PATENT DOCUMENTS

CN 105991247 A 10/2016
EP 3018921 A1 5/2016

OTHER PUBLICATIONS

Catt, Support of unicast, groupcast and broadcast in NR sidelink, 3GPP TSG RAN1 Meeting #94, R1-1808399, Aug. 20-24, 2018, pp. 1-4, Gothenburg, Sweden.
(Continued)

*Primary Examiner* — Mounir Moutaouakil
(74) *Attorney, Agent, or Firm* — Kunzler Bean & Adamson

(57) ABSTRACT

The subject application is related to a method and apparatus for Device-to-Device communication. A method for Device-to-Device communication includes transmitting a signal toward a group of user equipments (UEs); detecting a HARQ feedback signal accumulated by signal (s) from one or more UEs within the group of UEs; and transmitting a signal toward the group of UEs, wherein the UE and the group of UEs are configured to perform groupcast transmission.

9 Claims, 8 Drawing Sheets

(51) Int. Cl.
    *H04B 7/06*      (2006.01)
    *H04L 1/1829*    (2023.01)
    *H04L 1/00*      (2006.01)

(52) U.S. Cl.
    CPC ............ *H04L 2001/0093* (2013.01); *H04L 2001/0097* (2013.01)

(56) References Cited

U.S. PATENT DOCUMENTS

| | | | |
|---|---|---|---|
| 2011/0209025 A1* | 8/2011 | Takahashi | H04L 65/611 |
| | | | 714/752 |
| 2015/0382390 A1 | 12/2015 | Wong et al. | |
| 2016/0338082 A1 | 11/2016 | Yi et al. | |
| 2019/0104525 A1* | 4/2019 | Santhanam | H04W 28/0252 |
| 2021/0037603 A1* | 2/2021 | Li | H04L 5/0048 |
| 2021/0377912 A1* | 12/2021 | El Hamss | H04L 1/1877 |

OTHER PUBLICATIONS

Samsung, Discussion on support of unicast, groupcast and broadcast for NR V2X, 3GPP TSG RAN WG1 #94, R1-1808775, Aug. 20-24, 2018, pp. 1-3, Gothenburg, Sweden.

Samsung, Discussion on physical layer structures and procedures for NR V2X, 3GPP TSG RAN WG1 #94, R1-1808776, Aug. 20-24, 2018, pp. 1-8, Gothenburg, Sweden.

International Searching Authority, "Notification of Transmittal of the International Search Report and the Written Opinion of the International Searching Authority, or the Declaration", PCT/CN2018/108047, dated Sep. 27, 2018, pp. 1-6.

\* cited by examiner

| Time Member UE | P1 | P2 | P3 | P4 | P5 | P6 |
|---|---|---|---|---|---|---|
| | | | Operations | | | |
| UE2 | | 303 (NACK) | 304 & 305 | 303 (NACK) | 304 & 305 | monitoring |
| UE3 | 301 & 302 | 303 (NACK) | 304 & 305 | monitoring | monitoring | monitoring |
| UE4 | | monitoring | monitoring | monitoring | monitoring | monitoring |
| UE5 | | monitoring | monitoring | monitoring | monitoring | monitoring |

FIG. 4

| Time | Q1 | Q2 | Q3 | Q4 | Q5 | Q6 | Q7 | Q8 |
|---|---|---|---|---|---|---|---|---|
| Member UE | | | | | Operations | | | |
| UE2 | | monitoring | 303 (NACK) | monitoring | monitoring | 303 (NACK) | monitoring | monitoring |
| UE3 | 301 & 302 | monitoring | 303 (NACK) | monitoring | monitoring | 303 (NACK) | monitoring | monitoring |
| UE4 | | 303 (NACK) | (303 (NACK)) | 304 & 305 | monitoring | 303 (NACK) | monitoring | monitoring |
| UE5 | | 303 (NACK) | (303 (NACK)) | 304 & 305 | 303 (NACK) | (303 (NACK)) | 304 & 305 | monitoring |

FIG. 5

| Time | P1 | P2 | P3 | P4 | P5 | P6 |
|---|---|---|---|---|---|---|
| Member UE | | | Operations | | | |
| UE2 | | 303 (NACK) | 304 & 305 | 303 (NACK) | 304 & 305 | 303 (ACK) |
| UE3 | 301 & 302 | 303 (NACK) | 304 & 305 | 303 (ACK) | 304 | |
| UE4 | | 303 (ACK) | 304 | | 304 | |
| UE5 | | 303 (ACK) | 304 | | 304 | |

FIG. 6

METHOD AND APPARATUS FOR DEVICE-TO-DEVICE COMMUNICATION BASED ON A THRESHOLD

TECHNICAL FIELD

The subject application generally relates to NR sidelink communication, and more specifically to NR sidelink communication through groupcast transmission.

BACKGROUND

As relatively new and more demanding applications arise and a subscriber base increases exponentially, there is an urgent requirement to boost data rates and reduce latency. D2D communication is expected to play a prominent role in upcoming cellular networks as it provides ultra-low latency for communication among users. Such communication mode may operate in licensed or unlicensed spectrum.

D2D communication allows user equipments (UEs) in close proximity to communicate using a direct link rather than having their radio signal travel all the way through a base station (BS) or core network. UEs can communicate via direct D2D links. In terms of channel structure, the direct link between two UEs is called a sidelink, which can operate by frequency division duplex or time division duplex.

V2X (vehicle to everything) will be introduced into 5G wireless communication technique. Sidelink is an LTE feature introduced in 3GPP (3rd Generation Partnership Project) Release 12 aiming at enabling D2D communication within legacy cellular-based LTE (Long Term Evolution) radio access networks. D2D is applicable to public safety and commercial communication use-cases, and also to V2X scenario. Sidelink enables a direct communication between proximal UEs, and data does not need to go through the BS.

In order to meet the requirements of providing relatively good performance on D2D communication, sidelink, or NR sidelink (e.g. advanced 3GPP NR (New radio) V2X service), communication techniques, e.g. sidelink unicast transmission, sidelink groupcast transmission, sidelink broadcast transmission, or the like are developed.

SUMMARY

Some embodiments of the subject application provide a method, which is performed by a user equipment (UE). The method includes transmitting a first signal toward a group of UEs; detecting a first HARQ feedback signal accumulated by signal(s) from one or more UEs within the group of UEs; and transmitting a second signal toward the group of UEs, wherein the UE and the group of UEs are configured to perform groupcast transmission.

Some embodiments of the subject application provide an apparatus. The apparatus includes a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement methods for HARQ feedback for sidelink groupcast transmission, for example in a UE.

Some embodiments of the subject application provide a method, which is performed by one UE of a group of UEs. The method includes performing a first detection; receiving a first signal; transmitting a first HARQ feedback signal if an error occurs when decoding the first signal, wherein the first HARQ feedback signal is to be accumulated with another first HARQ feedback signal of another UE of the groups of UEs, and wherein the group of UEs and the UE are configured to perform groupcast transmission; performing a second detection; and receiving a second signal.

Some embodiments of the subject application also provide an apparatus. The apparatus includes a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement methods for HARQ feedback for sidelink groupcast transmission, for example in a UE.

BRIEF DESCRIPTION OF THE DRAWINGS

In order to describe the manner in which advantages and features of the subject application can be obtained, a description of the subject application is rendered by reference to specific embodiments thereof which are illustrated in the appended drawings. These drawings depict only example embodiments of the subject application and are not therefore to be considered as limiting of its scope.

FIG. 4 illustrates an exemplary sidelink groupcast transmission in accordance with some embodiments of the subject application;

FIG. 5 illustrates another exemplary sidelink groupcast transmission in accordance with some embodiments of the subject application;

FIG. 6 illustrates another exemplary sidelink groupcast transmission in accordance with some embodiments of the subject application;

DETAILED DESCRIPTION

The detailed description of the appended drawings is intended as a description of the currently preferred embodiments of the subject application, and is not intended to represent the only form in which the subject application may be practiced. It should be understood that the same or equivalent functions may be accomplished by different embodiments that are intended to be encompassed within the spirit and scope of the subject application.

Groupcast transmission, which may provide a relatively good performance (e.g. relatively good reliability), may be used to achieve a relatively good reliability of D2D communication (or sidelink) in various scenarios (e.g. 3GPP NR V2X scenario, etc.).

The HARQ feedback technique is used in wireless communication to indicate or represent whether data was correctly/successfully received (or decoded) during data transmission (e.g. downlink (DL) transmission or uplink (UL) transmission). HARQ may provide feedback, for example but is not limited to, Positive Acknowledgement (ACK) or Negative Acknowledgement (NACK). ACK may refer to a correct or successful data reception (or decoding). NACK may refer to an erroneously data reception (or decoding).

Some embodiments of the subject application provide a mechanism using the HARQ feedback technique to improve sidelink groupcast transmission.

Some embodiments of the subject application provide a method to perform sidelink groupcast transmission. Some embodiments of the subject application provide a method to perform sidelink groupcast transmission using the HARQ feedback technique.

Some embodiments of the subject application provide an apparatus for sidelink groupcast transmission. Some embodiments of the subject application provide an apparatus for sidelink groupcast transmission using the HARQ feedback technique.

Embodiments of the subject application may be provided in a network architecture that adopt various service scenarios, for example but is not limited to, 3GPP 5G NR (new radio), 3GPP LTE (Long Term Evolution) Release 12 and onwards, etc.

Figure 1:
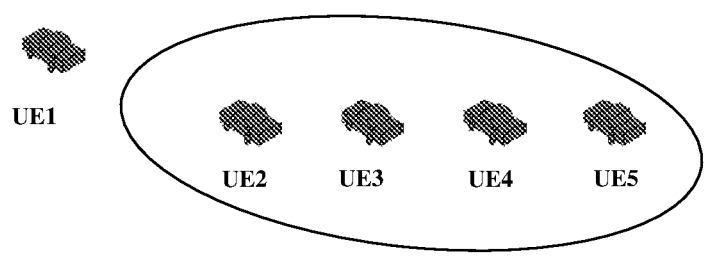
FIG. 1 illustrates an exemplary sidelink groupcast system in accordance with some embodiments of the subject application.

FIG. 1 illustrates an exemplary sidelink groupcast system in accordance with some embodiments of the subject application.

Referring to FIG. 1, the sidelink groupcast system includes some UEs, e.g. UE1, UE2, UE3, UE4, and UE5. UE1, UE2, UE3, UE4, and UE5 are configured to perform groupcast transmission. It is contemplated that the sidelink groupcast system may include more or less UEs in accordance with some other embodiments of the subject application. Although each of the UEs in FIG. 1 is shown in the shape of a car, it is contemplated that a sidelink groupcast system may include any type of UE (e.g. a cell phone, a computer, a laptop, IoT (internet of things) device or other type of device) in accordance with some other embodiments of the subject application.

A group of UEs which are configured to perform groupcast transmission may be referred to as a groupcast group of UEs or a sidelink groupcast group of UEs. UE(s) under NR V2X scenario may be referred to as V2X UE(s).

Still referring to FIG. 1, UE1, UE2, UE3, UE4, and UE5 together form a groupcast group of UEs. UE1 may function as a source UE. Each of UE2, UE3, UE4, and UE5 may function as a member UE.

A source UE within a groupcast group may transmit a groupcast message or a groupcast packet for all member UEs within the same groupcast group. Some or all of member UEs may detect and receive the groupcast message/packet from the source UE. A groupcast message (packet) may include scheduling assignment (SA) and groupcast data. SA in a groupcast message (packet) may indicate transmitting information associated with groupcast data in the groupcast message (packet).

In order to provide a relatively good reliability of sidelink groupcast transmission under various scenarios (e.g. NR V2X scenario), HARQ technique (e.g. the physical layer HARQ feedback technique) may be used in the subject application.

In some embodiments of the subject application, a HARQ feedback resource(s) is shared between UEs within a groupcast group (e.g. UE2, UE3, UE4, and UE5 as shown in FIG. 1). A HARQ feedback resource(s) may be a time resource, a frequency resource, a code resource, or a combination thereof. A HARQ feedback resource(s) may be shared only between some UEs within a groupcast group. A HARQ feedback resource(s) may be shared between all UEs within a groupcast group. Each of UEs within a groupcast group is configured to aware of information associated with HARQ feedback resource(s) shared between the UEs within a groupcast group. Each of UEs within a groupcast group may add information on the shared HARQ feedback resource(s). Each of UEs within a groupcast group may monitor the shared HARQ feedback resource(s). The shared HARQ feedback resource(s) may be detectable to each of UEs within a groupcast group. Each of UEs within a groupcast group may read information from the shared HARQ feedback resource(s).

A shared HARQ feedback resource(s) may carry one HARQ feedback signal of a single UE within a groupcast group. A shared HARQ feedback resource(s) may carry a HARQ feedback signal which is an accumulation, combination or sum of various feedback signals associated with two or more UEs within a groupcast group. For example, a HARQ feedback signal may be generated by accumulating, combining, or summing one HARQ feedback signal of one UE with another HARQ feedback signal of another UE within a groupcast group. For example, a HARQ feedback signal may be generated by accumulating, combining or summing one HARQ feedback signal of one UE with other HARQ feedback signals of other UEs within a groupcast group. A HARQ feedback signal may indicate HARQ feedback results of two or more UEs within a groupcast group for groupcast data transmission.

According to some embodiments of the subject application, UEs within a groupcast group share a HARQ feedback resource. The shared HARQ feedback resource may carry only an NACK feedback signal from a UE within a groupcast group. The shared HARQ feedback resource may carry only NACK feedback signals from some UEs within a groupcast group. The shared HARQ feedback resource may carry only NACK feedback signals from all the UEs within a groupcast group. In other words, the shared HARQ feedback resource does not carry ACK, and therefore the amount of HARQ feedback signals is reduced, such that overhead of the sidelink groupcast system as shown in FIG. 1 is minimized or relieved.

Figure 2:
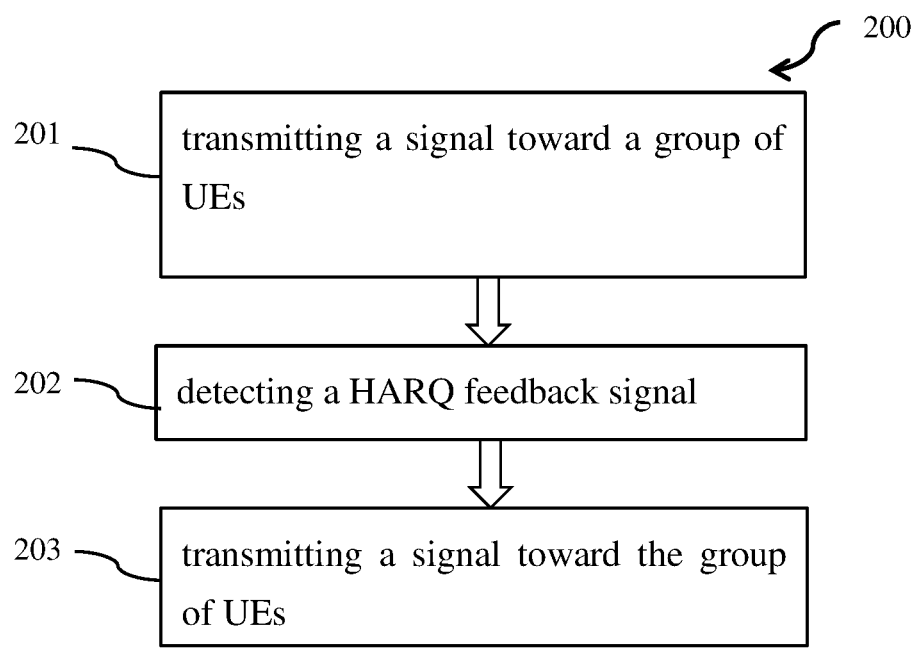
FIG. 2 illustrates operations to perform sidelink groupcast transmission in accordance with some embodiments of the subject application.

FIG. 2 illustrates operations to perform sidelink groupcast transmission in accordance with some embodiments of the subject application.

Referring to FIG. 2, method 200 is performed by a UE within a groupcast group (e.g. a source UE1 as illustrated and described with reference to FIG. 1) in accordance with some embodiments of the subject application.

In operation 201, a signal (e.g. groupcast message (packet)) is transmitted by UE1 as shown in FIG. 1 toward a group of UEs (e.g. UE2, UE3, UE4, and UE5 as illustrated and described with reference to FIG. 1).

In operation 202, a HARQ feedback signal is detected by UE1 as shown in FIG. 1. The HARQ feedback signal may include a signal from one UE (e.g. one of UE2, UE3, UE4, and UE5 as illustrated and described with reference to FIG. 1). The HARQ feedback signal may include a signal accumulated by signal(s) from some or all UEs within the group of UEs (e.g. some or all of UE2, UE3, UE4, and UE5 as illustrated and described with reference to FIG. 1).

In operation 203, another signal is transmitted by UE1 as shown in FIG. 1 toward the group of UEs (e.g. UE2, UE3, UE4, and UE5 as illustrated and described with reference to FIG. 1).

If the HARQ feedback signal detected in operation 202 carries no NACK feedback for the signal (e.g. groupcast message (packet)) transmitted in operation 201, a source UE (e.g. UE1 as shown in FIG. 1) may transmit another signal (e.g. another groupcast message (packet) or a new or next groupcast message (packet)) in operation 203.

If the HARQ feedback signal detected in operation 202 carries a NACK feedback for the signal (e.g. groupcast message (packet)) transmitted in operation 201, a source UE (e.g. UE1 as shown in FIG. 1) may again transmit the same signal (e.g. the signal (groupcast message (packet)) transmitted in operation 201) in operation 203. In other words, in operation 203, if the HARQ feedback signal detected in operation 202 is a NACK feedback for the signal (e.g. groupcast message (packet)) transmitted in operation 201, a source UE (e.g. UE1 as shown in FIG. 1) may retransmit the signal (groupcast message (packet)) transmitted in operation 201.

In some embodiments of the subject application, when determining whether to retransmit a groupcast message, a source UE (e.g. UE1 as shown in FIG. 1) may need to determine whether a transmission amount of a groupcast message (e.g. amount of transmission performed in operation 201 and of transmission performed prior to operation 201) reaches a threshold. For example, if an amount of total transmission of a groupcast message is less than the threshold, the source UE may determine to retransmit the groupcast message which was previously transmitted in operation 201. For example, even if the HARQ feedback signal detected in operation 202 carries a NACK feedback for the signal (e.g. groupcast message (packet)) transmitted in operation 201 (which indicates that an error occurs when a member UE decodes the groupcast message), the source UE does not retransmit the groupcast message, but starts transmitting a next or new groupcast message for member UEs within a groupcast group.

In some embodiments of the subject application, a source UE detects a HARQ feedback signal on HARQ feedback resource(s) shared by some UEs or all UEs within a groupcast group. In some embodiments of the subject application, a source UE detects a HARQ feedback signal on HARQ feedback resource(s) owned by one UE within a groupcast group.

Figure 3:
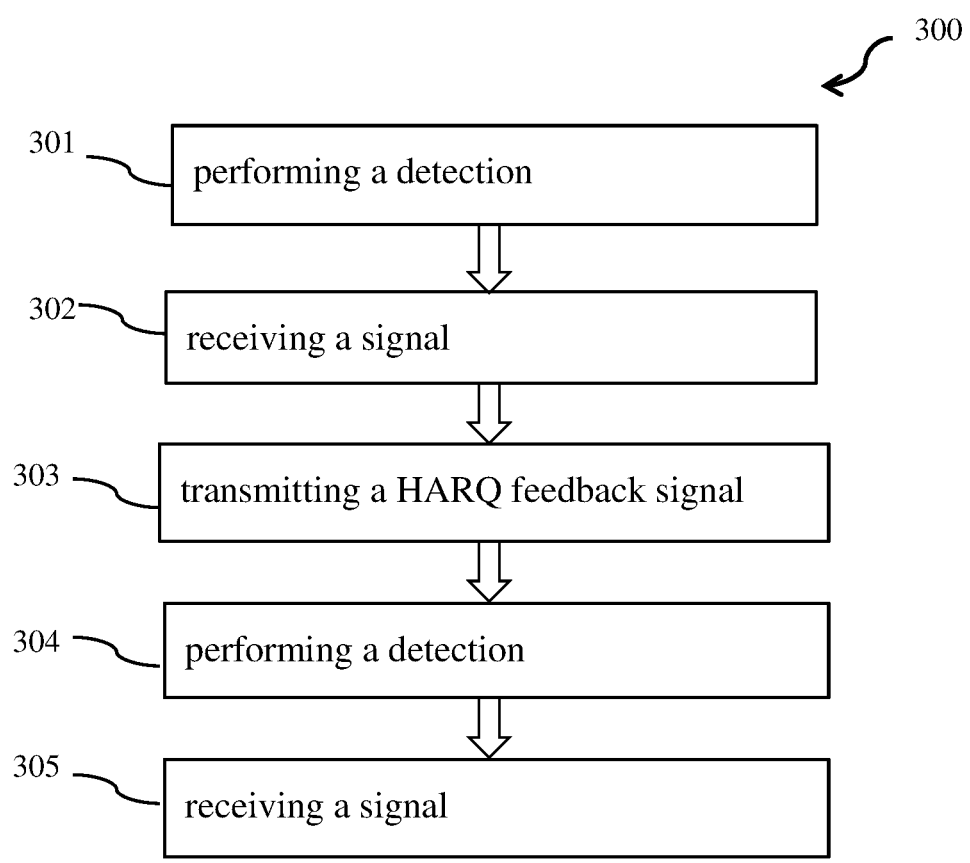
FIG. 3 illustrates operations to perform sidelink groupcast transmission in accordance with some embodiments of the subject application.

FIG. 3 illustrates operations to perform sidelink groupcast transmission in accordance with some embodiments of the subject application.

Referring to FIG. 3, method 300 is performed by a UE within a groupcast group (e.g. a member UE2, UE3, UE4 or UE5 as illustrated and described with reference to FIG. 1) in accordance with some embodiments of the subject application.

According to some embodiments of the subject application, a source UE (e.g. UE1 as shown in FIG. 1) may transmit a groupcast message (packet), which may include scheduling assignment (SA) and groupcast data, for other UEs within a groupcast group (e.g. member UE2, UE3, UE 4 and/or UE5). A member UE (e.g. UE2 as shown in FIG. 1) within the groupcast group (e.g. member UE2, UE3, UE 4 or UE5) may perform blind detection of SA in operation 301.

In operation 302, if SA is detected in operation 301, a signal (e.g. groupcast data in a groupcast message (packet)) is received by the member UE (e.g. UE2 as shown in FIG. 1) in accordance with the detected SA. The member UE (e.g. UE2 as shown in FIG. 1) may decode the received groupcast data.

In operation 303, a HARQ feedback signal is transmitted by the member UE (e.g. UE2 as shown in FIG. 1). The HARQ feedback signal transmitted in operation 303 is to be accumulated, combined or summed with another HARQ feedback signal of another member UE (e.g. member UE3, UE 4 or UE5). In some other embodiments of the subject application, the HARQ feedback signal transmitted in operation 303 is to be accumulated, combined or summed with another HARQ feedback signals of another member UEs (e.g. some or all of member UE2, UE3, UE4 and UE5).

In response to unsuccessfully receiving or decoding the groupcast data in operation 302, the member UE (e.g. UE2 as shown in FIG. 1) may send a NACK on the shared HARQ feedback resource. In other words, if an error occurs when receiving or decoding the groupcast data, the member UE (e.g. UE2 as shown in FIG. 1) sends a NACK on the shared HARQ feedback resource to notify the source UE (e.g. UE1 as shown in FIG. 1) of the error.

In operation 304, the member UE (e.g. UE2 as shown in FIG. 1) within the groupcast group (e.g. member UE2, UE3, UE 4 or UE5) may perform a detection, which may include a blind detection of SA or monitoring the shared HARQ feedback resource.

If the HARQ feedback signal transmitted in operation 303 carries no NACK feedback for the signal (e.g. successfully receiving or decoding the groupcast data in operation 302), the member UE (e.g. UE2 as shown in FIG. 1) monitors the shared HARQ feedback resource without sending any feedback. In other words, the member UE (e.g. UE2 as shown in FIG. 1), which successfully receives or decodes groupcast data, does not send ACK to the source UE (e.g. UE1 as shown in FIG. 1), but monitors the shared HARQ feedback resource.

In some embodiments of the subject application, when monitoring the shared HARQ feedback resource, if the member UE (e.g. UE2 as shown in FIG. 1) detects NACK on the shared HARQ feedback resource(s) (e.g. NACK feedback sent from other member UE (e.g. UE3 as shown in FIG. 1)), the member UE2 does not perform a blind detection of SA to save energy cost. In other words, the member UE2 may skip a blind detection of SA and correspondingly skip groupcast data reception according to the SA.

In operation 305, if the SA is detected in operation 304, a signal (e.g. groupcast data) is received by the member UE2 in accordance with the detected SA. The member UE2 may decode the received groupcast data.

The signal received in operation 305 may be the same to the signal received in operation 302. In other words, errors may occur during transmission of the signal in operation 305, which may lead to unsuccessful reception or decoding of the signal in operation 302.

The signal received in operation 305 may include some data which is the same to data in the signal received in operation 302. For example, the signal received in operation 305 may be the same to the signal transmitted from the source UE1 in operation 302.

The signal received in operation 305 may be different from the signal received in operation 302. For example, the signal received in operation 305 may include another signal (e.g. groupcast data in another groupcast message (packet) or a new groupcast message (packet) or a next groupcast message (packet)) which is different from the signal transmitted from the source UE1 in operation 302 when no NACK feedback is monitored or detected on the shared HARQ feedback resource as performed in operation 304.

FIG. 4 illustrates an exemplary sidelink groupcast transmission in accordance with some embodiments of the subject application.

A source UE (e.g. UE1 as shown in FIG. 1) may transmit a groupcast packet toward member UEs (e.g. UE2, UE3, UE4 and UE5 as shown in FIG. 1). Referring to FIG. 4, at a time or time period P1, each of UE2, UE3, UE4 and UE5 may perform operations 301 and 302 as illustrated and described with reference to FIG. 3. Each of UE2, UE3, UE4 and UE5 may perform blind detection of SA and receive groupcast data according to the detected SA. UE2 may not successfully receive or decode groupcast data. UE3 may not successfully receive or decode groupcast data. UE4 may successfully receive or decode groupcast data. UE5 may successfully receive or decode groupcast data.

At a time or time period P2, UE2, which did not successfully receive or decode groupcast data, may perform operation 303 as illustrated and described with reference to FIG. 3, to send a HARQ feedback signal "NACK" on a shared HARQ feedback resource "SHFR 1" (not shown in FIG. 4).

At a time or time period P2, UE3, which did not successfully receive or decode groupcast data, may perform operation 303 as illustrated and described with reference to FIG. 3, to send a HARQ feedback signal "NACK" on the shared HARQ feedback resource "SHFR 1."

At a time or time period P2, UE4, which successfully received or decoded groupcast data, may monitor the shared HARQ feedback resource "SHFR 1" without sending any feedback signal on the shared HARQ feedback resource "SHFR 1."

At a time or time period P2, UE5, which successfully received or decoded groupcast data, may monitor the shared HARQ feedback resource "SHFR 1" without sending any feedback signal on the shared HARQ feedback resource "SHFR 1."

At a time or time period P3, the source UE (e.g. UE1 as shown in FIG. 1) may detect the HARQ feedback signal "NACK" on the shared HARQ feedback resource "SHFR 1," and if a total transmission amount of the groupcast packet is less than a threshold, the source UE (e.g. UE1 as shown in FIG. 1) may transmit groupcast data of the same groupcast packet toward member UEs (e.g. UE2, UE3, UE4 and UE5 as shown in FIG. 1) within a groupcast group.

At a time or time period P3, each of UE2 and UE3 may perform operations 304 and 305 as illustrated and described with reference to FIG. 3. Each of UE2 and UE3 may perform blind detection of SA and receive groupcast data according to the detected SA. UE2 may not successfully receive or decode groupcast data. UE3 may successfully receive or decode groupcast data.

At a time or time period P3, each of UE4 and UE5 may monitor the shared HARQ feedback resource "SHFR 1" without sending any feedback signal on the shared HARQ feedback resource "SHFR 1."

At a time or time period P4, UE2, which did not successfully receive or decode groupcast data, may perform operation 303 as illustrated and described with reference to FIG. 3, to send a HARQ feedback signal "NACK" on another shared HARQ feedback resource "SHFR 2."

At a time or time period P4, UE3, which successfully received or decoded groupcast data, may monitor the shared HARQ feedback resource "SHFR 2" without sending any feedback signal on the shared HARQ feedback resource "SHFR 2."

At a time or time period P4, UE4, which successfully received or decoded groupcast data, may monitor the shared HARQ feedback resource "SHFR 2" without sending any feedback signal on the shared HARQ feedback resource "SHFR 2."

At a time or time period P4, UE5, which successfully received or decoded groupcast data, may monitor the shared HARQ feedback resource "SHFR 2" without sending any feedback signal on the shared HARQ feedback resource "SHFR 2."

At a time or time period P5, the source UE (e.g. UE1 as shown in FIG. 1) may detect the HARQ feedback signal "NACK" on the HARQ feedback resource "SHFR 2" sent by UE2, if a total transmission amount of the groupcast packet is less than a threshold, the source UE (e.g. UE1 as shown in FIG. 1) may transmit groupcast data of the same groupcast packet toward member UEs (e.g. UE2, UE3, UE4 and UE5 as shown in FIG. 1) within a groupcast group.

At a time or time period P5, UE2 may perform operations 304 and 305 as illustrated and described with reference to FIG. 3. UE2 may perform blind detection of SA and receive groupcast data according to the detected SA. UE2 may successfully receive or decode groupcast data.

At a time or time period P5, each of UE3, UE4 and UE5 may monitor the shared HARQ feedback resource "SHFR 2" without sending any feedback signal on the shared HARQ feedback resource "SHFR 2."

At a time or time period P6, each of UE2, UE3, UE4 and UE5 which successfully received or decoded groupcast data, may monitor the shared HARQ feedback resource "SHFR 2" without sending any feedback signal on the shared HARQ feedback resource "SHFR 2."

Subsequent to the time or time period P6, the source UE (e.g. UE1 as shown in FIG. 1) may perform groupcast transmission for a next or new groupcast message (packet).

By implementing the embodiment as shown in FIG. 4, all the member UEs (e.g. UE2, UE3, UE4 and UE5 as shown in FIG. 1) within a groupcast group successfully decode groupcast data transmitted from a source UE at the time or time period P6. Workload of the sidelink groupcast system as shown in FIG. 1 is reduced because the operation of blind detection of SA is skipped at least at time or time periods P3 (with respect to UE4 and UE5) and P5 (with respect to UE3, UE4 and UE5).

All the member UEs (e.g. UE2, UE3, UE4 and UE5 as shown in FIG. 1) share a same HARQ feedback resource, which includes only HARQ feedback signal(s) "NACK" but no HARQ feedback signal "ACK." Accordingly, workload of the sidelink groupcast system as shown in FIG. 1 is minimized or reduced.

FIG. 5 illustrates an exemplary sidelink groupcast transmission in accordance with some embodiments of the subject application.

The HARQ feedback resource described with reference to FIG. 4 may work at a same or similar frequency band to the HARQ feedback resource described with reference to FIG. 5. The HARQ feedback resource described with reference to FIG. 4 may work at a different frequency band from the HARQ feedback resource described with reference to FIG. 5.

A source UE (e.g. UE1 as shown in FIG. 1) may transmit a groupcast packet (message) toward member UEs (e.g. UE2, UE3, UE4 and UE5 as shown in FIG. 1). Referring to FIG. 5, at a time or time period Q1, each of UE2, UE3, UE4 and UE5 may perform operations 301 and 302 as illustrated and described with reference to FIG. 3. Each of UE2, UE3, UE4 and UE5 may perform blind detection of SA and receive groupcast data according to the detected SA. UE2 may successfully receive or decode groupcast data. UE3 may successfully receive or decode groupcast data. UE4 may not successfully receive or decode groupcast data. UE5 may not successfully receive or decode groupcast data.

At a time or time period Q2, UE2, which successfully received or decoded groupcast data, may monitor a shared HARQ feedback resource "SHFR 1" (not shown in FIG. 5) without sending any feedback signal on the shared HARQ feedback resource "SHFR 1."

At a time or time period Q2, UE3, which successfully received or decoded groupcast data, may monitor the shared HARQ feedback resource "SHFR 1" without sending any feedback signal on the shared HARQ feedback resource "SHFR 1."

At a time or time period Q2, UE4, which did not successfully receive or decode groupcast data, may perform operation 303 as illustrated and described with reference to FIG. 3, to send a HARQ feedback signal "NACK" on the shared HARQ feedback resource "SHFR 1."

At a time or time period Q2, UE5, which did not successfully receive or decode groupcast data, may perform operation 303 as illustrated and described with reference to FIG. 3, to send a HARQ feedback signal "NACK" on the shared HARQ feedback resource "SHFR 1."

At a time or time period Q3, UE2, which successfully received or decoded groupcast data and monitored "NACK" from the shared HARQ feedback resource "SHFR 1," may perform operation 303 as illustrated and described with reference to FIG. 3, to send a HARQ feedback signal "NACK" on another shared HARQ feedback resource "SHFR 2" (not shown in FIG. 5), to help relaying the HARQ feedback signal "NACK" on another shared HARQ feedback resource "SHFR 2."

At a time or time period Q3, UE3, which successfully received or decoded groupcast data and monitored "NACK" from the shared HARQ feedback resource "SHFR 1," may perform operation 303 as illustrated and described with reference to FIG. 3, to send a HARQ feedback signal "NACK" on the shared HARQ feedback resource "SHFR 2," to help relaying the HARQ feedback signal "NACK" on another shared HARQ feedback resource "SHFR 2."

At a time or time period Q3, UE4, which did not successfully receive or decode groupcast data, may again perform operation 303 as illustrated and described with reference to FIG. 3, to send a HARQ feedback signal "NACK" on the shared HARQ feedback resource "SHFR 2." Alternatively, at the time or time period Q3, UE4, which did not successfully receive or decode groupcast data, may skip sending the HARQ feedback signal "NACK" on the shared HARQ feedback resource "SHFR 2."

At a time or time period Q3, UE5, which did not successfully receive or decode groupcast data, may again perform operation 303 as illustrated and described with reference to FIG. 3, to send a HARQ feedback signal "NACK" on the shared HARQ feedback resource "SHFR 2." Alternatively, at the time or time period Q3, UE5, which did not successfully receive or decode groupcast data, may skip sending the HARQ feedback signal "NACK" on the shared HARQ feedback resource "SHFR 2."

At a time or time period Q4, the source UE (e.g. UE1 as shown in FIG. 1) may detect the HARQ feedback signal "NACK" on the HARQ feedback resource "SHFR 1" or the HARQ feedback resource "SHFR 2" or both, and if a total transmission amount of the groupcast packet is less than a threshold, the source UE (e.g. UE1 as shown in FIG. 1) may transmit groupcast data of the same groupcast packet toward member UEs (e.g. UE2, UE3, UE4 and UE5 as shown in FIG. 1) within a groupcast group.

At a time or time period Q4, each of UE4 and UE5 may perform operations 304 and 305 as illustrated and described with reference to FIG. 3. Each of UE4 and UE5 may perform blind detection of SA and receive groupcast data according to the detected SA. UE5 may not successfully receive or decode groupcast data. UE4 may successfully receive or decode groupcast data.

At a time or time period Q4, each of UE2 and UE3 may monitor the HARQ feedback resource "SHFR 1" or the HARQ feedback resource "SHFR 2" or both without sending any feedback signal on the HARQ feedback resource "SHFR 1" or the HARQ feedback resource "SHFR 2" or both.

At a time or time period Q5, each of UE2 and UE3, which successfully received or decoded groupcast data, may monitor the HARQ feedback resource "SHFR 1" or the HARQ feedback resource "SHFR 2" or both without sending any feedback signal to the HARQ feedback resource "SHFR 1" or the HARQ feedback resource "SHFR 2" or both.

At a time or time period Q5, UE4, which successfully received or decoded groupcast data, may monitor the HARQ feedback resource "SHFR 1" or the HARQ feedback resource "SHFR 2" or both without sending any feedback signal on the HARQ feedback resource "SHFR 1" or the HARQ feedback resource "SHFR 2" or both.

At a time or time period Q5, UE5, which did not successfully receive or decode groupcast data, may perform operation 303 as illustrated and described with reference to FIG. 3, to send a HARQ feedback signal "NACK" on another shared HARQ feedback resource "SHFR 3."

At a time or time period Q6, UE2, which successfully received or decoded groupcast data and monitored "NACK" from the shared HARQ feedback resource "SHFR 3," may perform operation 303 as illustrated and described with reference to FIG. 3, to send a HARQ feedback signal "NACK" on another shared HARQ feedback resource "SHFR 4," to help relaying the HARQ feedback signal "NACK" on another shared HARQ feedback resource "SHFR 3."

At a time or time period Q6, UE3, which successfully received or decoded groupcast data and monitored "NACK" from the shared HARQ feedback resource "SHFR 3," may perform operation 303 as illustrated and described with reference to FIG. 3, to send a HARQ feedback signal "NACK" on the shared HARQ feedback resource "SHFR 4," to help relaying the HARQ feedback signal "NACK" on another shared HARQ feedback resource "SHFR 3."

At a time or time period Q6, UE4, which successfully received or decoded groupcast data and monitored "NACK" from the shared HARQ feedback resource "SHFR 3," may perform operation 303 as illustrated and described with reference to FIG. 3, to send a HARQ feedback signal "NACK" on the shared HARQ feedback resource "SHFR 4," to help relaying the HARQ feedback signal "NACK" on another shared HARQ feedback resource "SHFR 3."

At a time or time period Q6, UE5, which did not successfully receive or decode groupcast data, may again perform operation 303 as illustrated and described with reference to FIG. 3, to send a HARQ feedback signal "NACK" on the shared HARQ feedback resource "SHFR 4." Alternatively, at the time or time period Q6, UE5, which did not successfully receive or decode groupcast data, may skip sending the HARQ feedback signal "NACK" on the shared HARQ feedback resource "SHFR 4."

At a time or time period Q7, the source UE (e.g. UE1 as shown in FIG. 1) may detect the HARQ feedback signal "NACK" on the HARQ feedback resource "SHFR 3" or the HARQ feedback resource "SHFR 4" or both, and if a total transmission amount of the groupcast packet is less than a threshold, the source UE (e.g. UE1 as shown in FIG. 1) may transmit groupcast data of the same groupcast packet toward member UEs (e.g. UE2, UE3, UE4 and UE5 as shown in FIG. 1) within a groupcast group.

At a time or time period Q7, UE5 may perform operations 304 and 305 as illustrated and described with reference to FIG. 3. UE5 may perform blind detection of SA and receive groupcast data according to the detected SA. UE5 may successfully receive or decode groupcast data.

At a time or time period Q8, each of UE2, UE3, UE4 and UE5, which successfully received or decoded groupcast data, may perform operation 303 as illustrated and described with reference to FIG. 3, to monitor the HARQ feedback resource "SHFR 3" or the HARQ feedback resource "SHFR 4" or both without sending any feedback signal on the HARQ feedback resource "SHFR 3" or the HARQ feedback resource "SHFR 4" or both.

Subsequent to the time or time period Q8, the source UE (e.g. UE1 as shown in FIG. 1) may perform groupcast transmission for a next or new groupcast message (packet).

By implementing the embodiment as shown in FIG. 5, all the member UEs (e.g. UE2, UE3, UE4 and UE5 as shown in FIG. 1) within a groupcast group successfully decode groupcast data transmitted from a source UE at the time or time period Q8. Workload of the sidelink groupcast system as shown in FIG. 1 is reduced because the operation of blind detection of SA is skipped at least at time or time periods Q4 (with respect to UE2 and US3) and Q7 (with respect to UE2, UE3 and US4).

All the member UEs (e.g. UE2, UE3, UE4 and UE5 as shown in FIG. 1) share HARQ feedback resources "SHFR 1," "SHFR 2," "SHFR 3," and "SHFR 4." Each of HARQ feedback resources "SHFR 1," "SHFR 2," "SHFR 3," and "SHFR 4" includes only HARQ feedback signal(s) "NACK" but no HARQ feedback signal "ACK." Accordingly, workload of the sidelink groupcast system as shown in FIG. 1 is minimized or reduced.

FIG. 6 illustrates another exemplary sidelink groupcast transmission in accordance with some embodiments of the subject application. A source UE (e.g. UE1 as shown in FIG. 1) may transmit a groupcast packet toward member UEs (e.g. UE2, UE3, UE4 and UE5 as shown in FIG. 1). According to the embodiments in FIG. 6, each member UE (e.g. each of UE2-UE5 as shown in FIG. 1) within the groupcast group uses a dedicated HARQ feedback resource, and each member UE sends ACK or NACK on the dedicated HARQ feedback resource.

Referring to FIG. 6, at a time or time period P1, each of UE2, UE3, UE4 and UE5 may perform operations 301 and 302 as illustrated and described with reference to FIG. 3. Each of UE2, UE3, UE4 and UE5 may perform blind detection of SA and receive groupcast data according to the detected SA. UE2 may not successfully receive or decode groupcast data. UE3 may not successfully receive or decode groupcast data. UE4 may successfully receive or decode groupcast data. UE5 may successfully receive or decode groupcast data.

At a time or time period P2, UE2, which did not successfully receive or decode groupcast data, may perform operation 303 as illustrated and described with reference to FIG. 3, to send a HARQ feedback signal "NACK" on a HARQ feedback resource "HFR 1" (not shown in FIG. 6).

At a time or time period P2, UE3, which did not successfully receive or decode groupcast data, may perform operation 303 as illustrated and described with reference to FIG. 3, to send a HARQ feedback signal "NACK" on a HARQ feedback resource "HFR 2."

At a time or time period P2, UE4, which successfully received or decoded groupcast data, may perform operation 303 as illustrated and described with reference to FIG. 3, to send an HARQ feedback signal "ACK" on a HARQ feedback resource "HFR 3."

At a time or time period P2, UE5, which successfully received or decoded groupcast data, may perform operation 303 as illustrated and described with reference to FIG. 3, to send a HARQ feedback signal "ACK" on a HARQ feedback resource "HFR 4."

At a time or time period P3, the source UE (e.g. UE1 as shown in FIG. 1) may detect the HARQ feedback signal "NACK" or "ACK" on all HARQ feedback resources (i.e., "HFR 1," "HFR 2," "HFR 3," and "HFR 4"), and if "NACK" is detected on the HARQ feedback resources and if a total transmission amount of the groupcast packet is less than a threshold, the source UE (e.g. UE1 as shown in FIG. 1) may transmit groupcast data of the same groupcast packet toward member UEs (e.g. UE2, UE3, UE4 and UE5 as shown in FIG. 1) within a groupcast group.

At a time or time period P3, each of UE2 and UE3 may perform operations 304 and 305 as illustrated and described with reference to FIG. 3. Each of UE2 and UE3 may perform blind detection of SA and receive groupcast data according to the detected SA. UE2 may not successfully receive or decode groupcast data. UE3 may successfully receive or decode groupcast data.

At a time or time period P3, each of UE4 and UE5 may perform operations 304 as illustrated and described with reference to FIG. 3, to perform blind detection of SA but skip receiving groupcast data according to the detected SA.

At a time or time period P4, UE2, which did not successfully receive or decode groupcast data, may perform operation 303 as illustrated and described with reference to FIG. 3, to send a HARQ feedback signal "NACK" on another HARQ feedback resource "HFR 5."

At a time or time period P4, UE3, which successfully received or decoded groupcast data, may perform operation 303 as illustrated and described with reference to FIG. 3, to send a HARQ feedback signal "ACK" on another HARQ feedback resource "HFR 6." At a time or time period P6, all UE4 and UE5 do not perform operations in FIG. 3.

At a time or time period P5, the source UE (e.g. UE1 as shown in FIG. 1) may detect the HARQ feedback signal "NACK" or "ACK" on the HARQ feedback resources "HFR 5" and "HFR 6," and if "NACK" is detected on the HARQ feedback resources and if a total transmission amount of the groupcast packet is less than a threshold, the source UE (e.g. UE1 as shown in FIG. 1) may transmit groupcast data of the same groupcast packet toward member UEs (e.g. UE2, UE3, UE4 and UE5 as shown in FIG. 1) within a groupcast group.

At a time or time period P5, UE2 may perform operations 304 and 305 as illustrated and described with reference to FIG. 3. UE2 may perform blind detection of SA and receive groupcast data according to the detected SA. UE2 may successfully receive or decode groupcast data.

At a time or time period P5, each of UE3, UE4 and UE5 may perform operations 304 as illustrated and described with reference to FIG. 3, to perform blind detection of SA but skip receiving groupcast data according to the detected SA.

At a time or time period P6, UE2, which successfully received or decoded groupcast data, may perform operation 303 as illustrated and described with reference to FIG. 3, to send a HARQ feedback signal "ACK" on another HARQ feedback resource "HFR 7." At a time or time period P6, all UE3-UE5 do not perform operations in FIG. 3.

Subsequent to the time or time period P6, the source UE (e.g. UE1 as shown in FIG. 1) may perform groupcast transmission for a next or new groupcast message (packet).

By implementing the embodiment as shown in FIG. 6, all the member UEs (e.g. UE2, UE3, UE4 and UE5 as shown in FIG. 1) within a groupcast group successfully decode groupcast data transmitted from a source UE at the time or time period P6. Workload of the sidelink groupcast system as shown in FIG. 1 is reduced because the operation of receiving groupcast data according to the detected SA is skipped at least at time or time periods P3 (with respect to UE4 and UE5) and P5 (with respect to UE3, UE4 and UE5).

Each member UE (e.g. UE2, UE3, UE4 or UE5 as shown in FIG. 1) use its own dedicated HARQ feedback resource, which includes HARQ feedback signal "NACK" or HARQ feedback signal "ACK," and thus a Discontinuous Transmission (DTX) problem may be avoided in a groupcast group.

Some embodiments of the subject application provide a method to perform sidelink groupcast transmission supporting multi-beam operations. Some embodiments of the subject application provide a method to perform sidelink groupcast transmission using the HARQ feedback technique supporting multi-beam operations.

Some embodiments of the subject application provide an apparatus for sidelink groupcast transmission supporting multi-beam operations. Some embodiments of the subject application provide an apparatus for sidelink groupcast transmission using the HARQ feedback technique supporting multi-beam operations.

Figure 7:
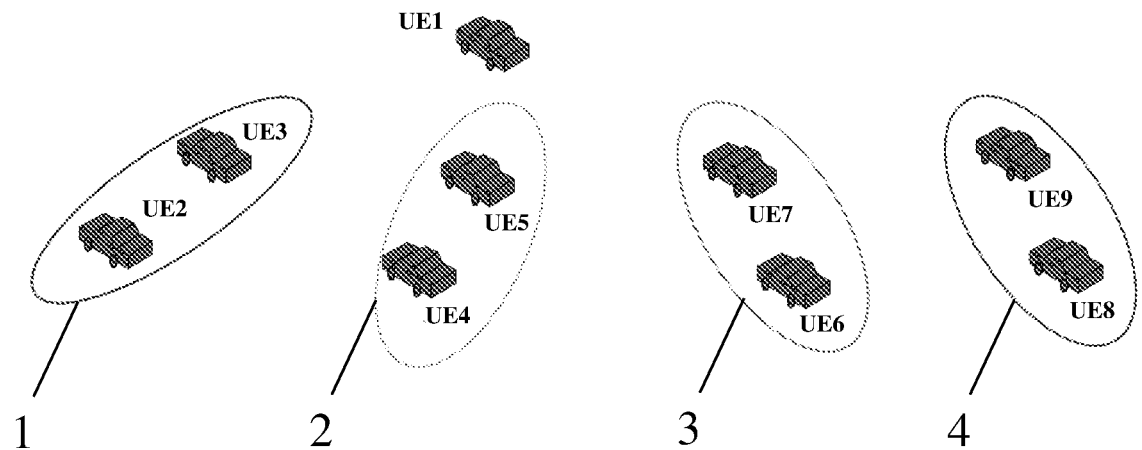
FIG. 7 illustrates another exemplary sidelink groupcast system in accordance with some embodiments of the subject application.

FIG. 7 illustrates another exemplary sidelink groupcast system in accordance with some embodiments of the subject application.

Referring to FIG. 7, a sidelink groupcast system includes UE1, UE2, UE3, UE4, UE5, UE6, UE7, UE8 and UE9. UE1, UE2, UE3, UE4, UE5, UE6, UE7, UE8 and UE9 form a groupcast group which supports multi-beam operation. UE1 may function as a source UE. Each of UE2, UE3, UE4, UE5, UE6, UE7, UE8 and UE9 may function as member UEs. It is contemplated that the sidelink groupcast system in FIG. 7 may include more or less UEs in accordance with some other embodiments of the subject application.

The sidelink groupcast system in FIG. 7 may include four beams 1, 2, 3 and 4. UE2 and UE3 are disposed or located in coverage of beam 1. UE4 and UE5 are disposed or located in coverage of beam 2. UE6 and UE7 are disposed or located in coverage of beam 3. UE8 and UE9 are disposed or located in coverage of beam 4. It is contemplated that the sidelink groupcast system in FIG. 7 may include more or less beams of various directions. It is contemplated that each beam in the sidelink groupcast system in FIG. 7 may include more or less UEs in accordance with some other embodiments of the subject application.

Although each of the UEs in FIG. 7 is shown in a shape of a car, it is contemplated that a sidelink groupcast system may include any type of UE (e.g. a cell phone, a computer, a laptop, IoT (internet of things) device or other type of device) in accordance with some other embodiments of the subject application.

According to some embodiments of the subject application, a beam sweeping operation may be performed for a sidelink groupcast system. UEs within each beam may share a HARQ feedback resource, and the HARQ feedback resource only includes NACK feedback signal from UEs within each beam, but does not include ACK, in order to reduce HARQ feedback overhead. In other words, the number of HARQ feedback resources used in a sidelink groupcast system may depend upon the number of beams within the sidelink groupcast system.

Figure 8A:
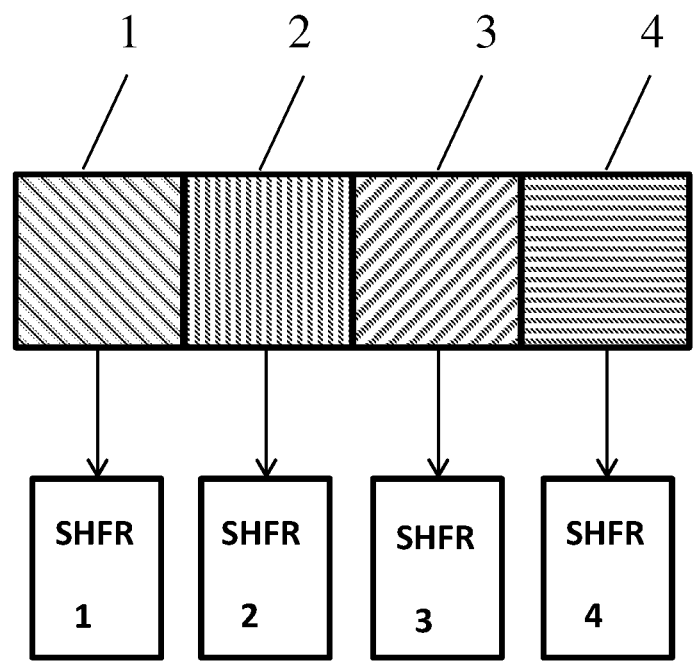
FIGS. 8A and 8B illustrate another exemplary sidelink groupcast transmissions in accordance with some embodiments of the subject application.
Figure 8B:
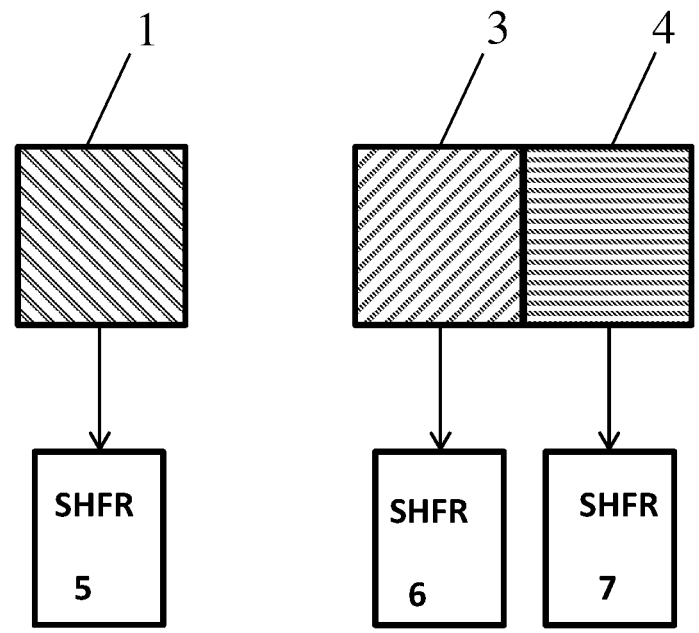

FIGS. 8A and 8B illustrate another exemplary sidelink groupcast transmissions in accordance with some embodiments of the subject application.

Referring to FIGS. 8A and 8B, a source UE (e.g. UE1 as shown in FIG. 7) may perform beam sweeping to transmit a groupcast packet toward member UEs (e.g. UE2, UE3, UE4, UE5, UE6, UE7, UE8, and UE9 as shown in FIG. 7) in each beam (e.g. beams 1, 2, 3, and 4 as shown in FIG. 7). UEs within one beam share a HARQ feedback resource, in order to notify decoding feedback of UEs in the beam for the transmitted groupcast packet during one beam sweeping operation to the source UE.

The shared HARQ feedback resource may carry only an NACK feedback signal from a UE within a beam. The shared HARQ feedback resource may carry only NACK feedback signals from some UEs within a beam. The shared HARQ feedback resource may carry only NACK feedback signals from all the UEs within a beam. In other words, the shared HARQ feedback resource does not carry ACK, and therefore amount of HARQ feedback signals is reduced, such that overhead of the sidelink groupcast system as shown in FIGS. 8A and 8B is minimized or relieved.

For example, since four beams in a sidelink groupcast system are swept during one beam sweeping operation as shown in FIG. 8A, UEs within the sidelink groupcast system may use four shared HARQ feedback resources (i.e., "SHFR 1," "SHFR 2," "SHFR 3," and "SHFR 4" as shown in FIG. 8A) in total for the groupcast packet during the beam sweeping operation. Similarly, since three beams in a sidelink groupcast system are swept during one beam sweeping operation as shown in FIG. 8B, UEs within the sidelink groupcast system may use three shared HARQ feedback resources (i.e., "SHFR 5," "SHFR 6," and "SHFR 7" as shown in FIG. 8B) in total for the groupcast packet during the beam sweeping operation.

Referring to FIG. 8A, UEs in each beam (e.g.UE2 and UE3 in beam 1 as shown in FIG. 7) may perform operations 301 and 302 as illustrated and described with reference to FIG. 3. UEs in each beam may perform blind detection of SA and receive groupcast data according to the detected SA. Each UE in a beam may successfully or not successfully receive or decode groupcast data.

In response to at least one member UE in one beam (e.g. UE2 or UE3 in beam 1 as shown in FIG. 7) unsuccessfully decoding a groupcast data, NACK is sent on a shared HARQ feedback resource for member UEs in the beam (e.g. "SHFR 1" as shown in FIG. 8A). Accordingly, if each beam includes at least one member UE which unsuccessfully decoding a groupcast data, NACK are sent on all shared HARQ feedback resources (e.g. "SHFR 1," "SHFR 2," "SHFR 3," and "SHFR 4" as shown in FIG. 8A) for member UEs in all beams of a sidelink groupcast system. If all member UEs in a beam (e.g. UE4 and UE5 in beam 2 as shown in FIG. 8A) successfully decode a groupcast data, NACK is not sent on a shared HARQ feedback resources (e.g. "SHFR 2" as shown in FIG. 8A) for member UEs in the beam.

According to some embodiments of the subject application, if a source UE (e.g. UE1 as shown in FIG. 7) detects NACK for a groupcast packet on a shared HARQ feedback resource for member UEs in one beam and a total transmission amount of the groupcast packet is less than a threshold, the source UE may again perform a beam sweeping operation to the beam, to re-transmit groupcast data in the groupcast packet toward member UEs within the beam.

For example, in response to UE4 and UE5 in beam 2 as shown in FIG. 8A successfully decoding a groupcast data, UE4 and UE5 in beam 2 would not send any feedback on their shared HARQ feedback resource "SHFR 2". Accordingly, the shared HARQ feedback resource for beam 2 does not include any feedback, and each of other three shared HARQ feedback resources (i.e., "SHFR 1," "SHFR 3," and "SHFR 4" as shown in FIG. 8A) for beams 1, 3, and 4 (which include UE2 and UE3, UE6 and UE7, and UE8 and UE9, respectively) includes NACK.

After detecting NACK on "SHFR 1," "SHFR 3," and "SHFR 4", if a total transmission amount of the groupcast packet is less than a threshold, a source UE may again perform a beam sweeping operation to beams 1, 3, and 4, respectively, to re-transmit groupcast data in the groupcast packet toward all member UEs within beams 1, 3, and 4, as shown in FIG. 8B, without re-transmitting groupcast data in the groupcast packet toward UE4 and UE5 in beam 2.

During the beam sweeping operation to beams 1, 3, and 4, UE4 and UE5 in beam 2 may skip the blind detection of SA and the corresponding groupcast data reception, whereas all member UEs in other beams (i.e., UE2 and UE3, UE6 and UE7, and UE8 and UE9 as shown in FIG. 7) perform blind detection of SA and receives groupcast data according to the detected SA. Then, all member UEs within beams 1, 3, and 4 may send corresponding feedback on their shared HARQ feedback resources (i.e., "SHFR 5," "SHFR 6," and "SHFR 7" as shown in FIG. 8B), respectively.

In other words, since three beams in a sidelink groupcast system are swept during the beam sweeping operation as shown in FIG. 8B, UEs within the sidelink groupcast system may use three shared HARQ feedback resources in total (i.e., "SHFR 5," "SHFR 6," and "SHFR 7" as shown in FIG. 8B) for the groupcast packet during the beam sweeping. Then, the source UE may determine subsequent operations according to detected HARQ feedback information in the HARQ feedback resources.

Figure 9A:
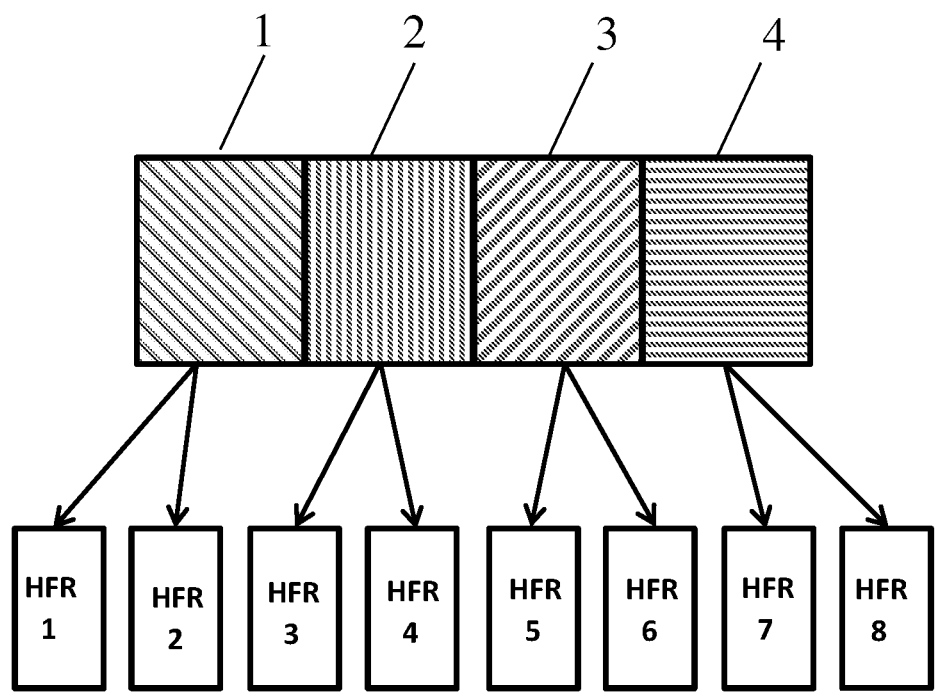
FIGS. 9A and 9B illustrate another exemplary sidelink groupcast transmissions in accordance with some embodiments of the subject application.
Figure 9B:
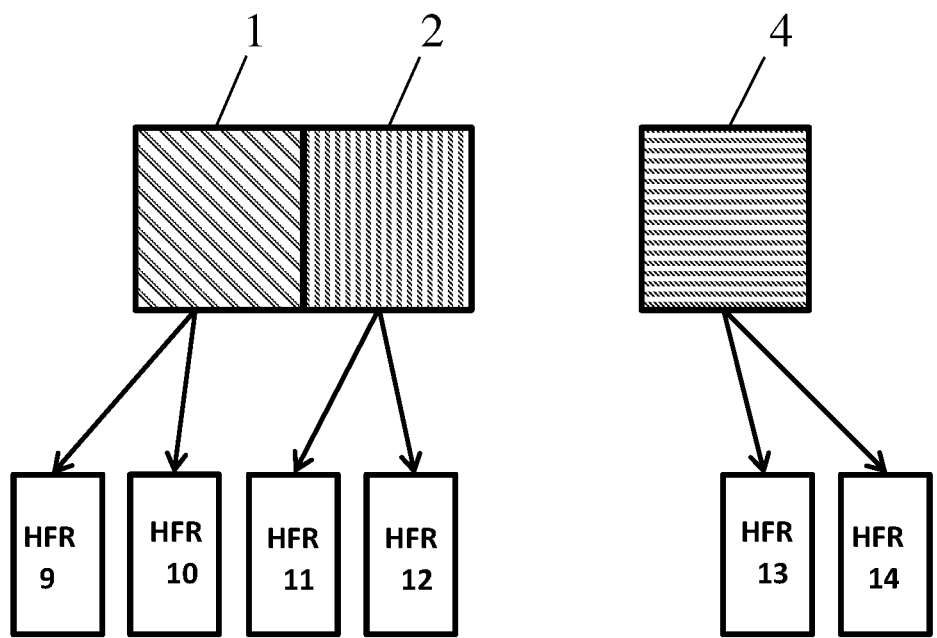

FIGS. 9A and 9B illustrate another exemplary sidelink groupcast transmissions in accordance with some embodiments of the subject application.

Referring to FIGS. 9A and 9B, a source UE (e.g. UE1 as shown in FIG. 7) may perform beam sweeping to transmit a groupcast packet toward member UEs (e.g. UE2, UE3, UE4, UE5, UE6, UE7, UE8, and UE9 as shown in FIG. 7) in each beam (e.g. beams 1, 2, 3, and 4 as shown in FIG. 7). Each member UE within a beam may use a dedicated HARQ feedback resource, and each member UE sends ACK or NACK on the dedicated HARQ feedback resource, in order to notify decoding feedback of the UE for the transmitted groupcast packet during one beam sweeping operation to the source UE.

For example, since all beams (e.g. beams 1, 2, 3, and 4 as shown in FIG. 7) of a sidelink groupcast system are swept during one beam sweeping operation as shown in FIG. 9A, eight UEs (e.g. UE2, UE3, UE4, UE5, UE6, UE7, UE8, and UE9 as shown in FIG. 7) within all beams of the sidelink groupcast system may use eight HARQ feedback resources (i.e., "HFR 1," "HFR 2," "HFR 3," "HFR 4," "HFR 5," "HFR 6," "HFR 7," and "HFR 8" as shown in FIG. 9A) respectively for the groupcast packet during the beam sweeping operation.

Similarly, since three beams (e.g. beams 1, 2, and 4 as shown in FIG. 7) in a sidelink groupcast system are swept during one beam sweeping operation as shown in FIG. 9B, six UEs (e.g. UE2, UE3, UE4, UE5, UE8, and UE9 as shown in FIG. 7) in the three beams within the sidelink groupcast system may use six HARQ feedback resources (i.e., "HFR 9," "HFR 10," "HFR 11," "HFR 12," "HFR 13," and "HFR 14" as shown in FIG. 9B) in total for the groupcast packet during the beam sweeping operation.

Referring to FIG. 9A, UEs in each beam (e.g. UE2 and UE3 in beam 1 as shown in FIG. 7) may perform operations 301 and 302 as illustrated and described with reference to FIG. 3. UEs in each beam may perform blind detection of SA and receive groupcast data according to the detected SA. Each UE in a beam may successfully receive or decode groupcast data and send ACK on its dedicated HARQ feedback resource. Each UE in a beam may not successfully receive or decode groupcast data and send NACK on its dedicated HARQ feedback resource.

In response to at least one member UE in one beam (e.g. UE2 in beam 1 as shown in FIG. 7) unsuccessfully decoding a groupcast data, NACK is sent on its dedicated HARQ feedback resource (e.g. "HFR 1" as shown in FIG. 9A). Accordingly, a source UE needs to perform a beam sweeping operation to all member UEs (e.g. UE2 and UE3 as shown in FIG. 7) in the beam (e.g. beam 1 as shown in FIG. 7), to re-transmit groupcast data in the groupcast packet toward all member UEs.

If all member UEs in a beam (e.g. UE6 and UE7 in beam 3 as shown in FIG. 7) successfully decode a groupcast data, all dedicated HARQ feedback resources (e.g. "HFR 5" and "HFR 6" as shown in FIG. 9A) for all member UEs in the beam include ACK. Accordingly, a source UE does not need to perform a beam sweeping operation to all member UEs (e.g. UE6 and UE7 as shown in FIG. 7) in the beam (e.g. beam 3 as shown in FIG. 7), as illustrated in FIG. 9B.

During the beam sweeping operation to beams 1, 2, and 4, UE6 and UE7 in beam 3 may skip the blind detection of SA and the corresponding groupcast data reception, whereas all member UEs in other beams (i.e., UE2 and UE3, UE4 and UE5, and UE8 and UE9 as shown in FIG. 7) perform blind detection of SA and receives groupcast data according to the detected SA. Then, all member UEs within beams 1, 2, and 4 may send corresponding feedback on their own dedicated HARQ feedback resources (i.e., "HFR 9," "HFR 10," "HFR 11," "HFR 12," "HFR 13," and "HFR 14" as shown in FIG. 9B), respectively.

In other words, since three beams in a sidelink groupcast system are swept during the beam sweeping operation as shown in FIG. 9B, UEs within the sidelink groupcast system may use six dedicated HARQ feedback resources in total (i.e., "HFR 9," "HFR 10," "HFR 11," "HFR 12," "HFR 13," and "HFR 14" as shown in FIG. 9B) for the groupcast packet during the beam sweeping. Then, the source UE may determine subsequent operations according to detected HARQ feedback information in the dedicated HARQ feedback resources.

All embodiments described in the subject application, for example, all embodiments described for FIGS. 4-6, 8, and 9, are applicable for the flowcharts of FIGS. 2 and 3.

Figure 10:
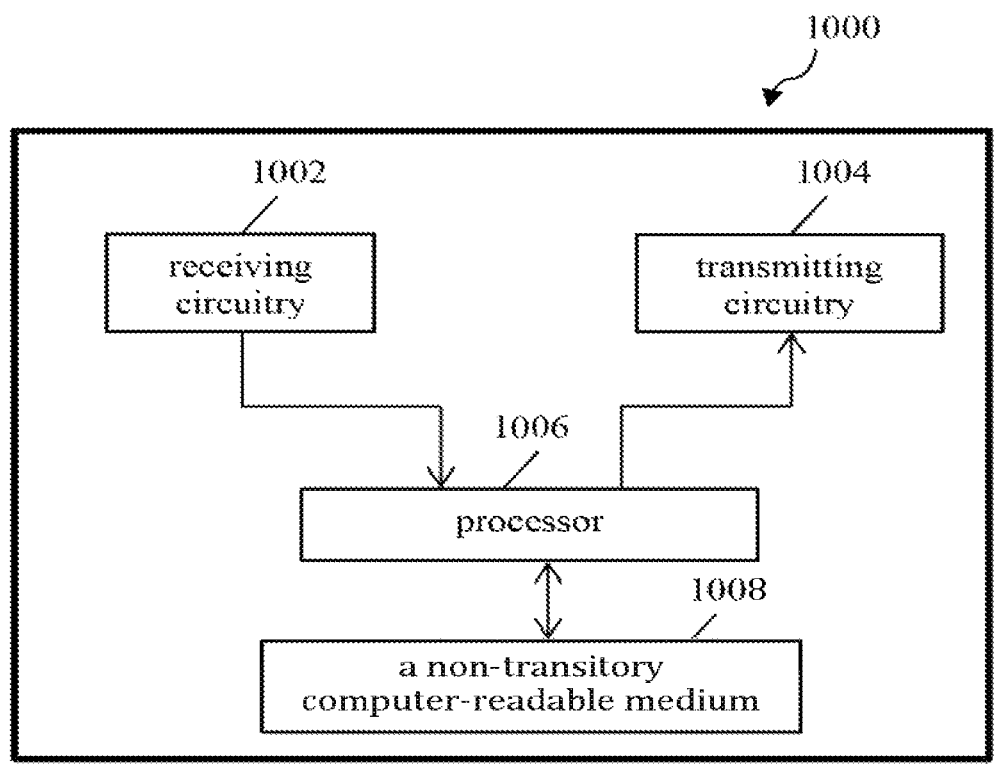
FIG. 10 illustrates an exemplary apparatus in accordance with some embodiments of the subject application.

FIG. 10 illustrates an exemplary apparatus in accordance with some embodiments of the subject application.

Referring to FIG. 10, the apparatus 1000 may include a non-transitory computer-readable medium 1008, a receiving circuitry 1002, a transmitting circuitry 1004, and a processor 1006 coupled to the non-transitory computer-readable medium 1008, the receiving circuitry and the transmitting circuitry. The apparatus 1000 may include a UE, a source UE, a member UE, a V2X UE or other device that supports D2D communication or sidelink transmission.

It is contemplated that some components are omitted in FIG. 10 for simplicity. In some embodiments, the receiving circuitry 1002 and the transmitting circuitry 1004 may be integrated into a single component (e.g. a transceiver).

In some embodiments, the non-transitory computer-readable medium 1008 may have stored thereon computer-executable instructions to cause a processor to implement the operations with respect to the UE(s) as described above. For example, the computer-executable instructions may be executed to cause the processor 1006 to control the receiving circuitry 1002 and transmitting circuitry 1004 to perform the operations with respect to the UE(s) as described and illustrated with respect to FIGS. 2-6, 8, and 9.

The method of the subject application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the subject application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE) comprising:
    transmitting a first signal toward a group of UEs;
    detecting a first hybrid automatic repeat request (HARQ) feedback signal accumulated by signal(s) from one or more UEs within the group of UEs; and
    transmitting a second signal toward the group of UEs, wherein:
        the UE and the group of UEs are configured to perform groupcast transmission;
        the second signal is a retransmission of the first signal in response to a total number of transmissions of the first signal being less than a threshold value and the first HARQ feedback signal comprises a negative acknowledgement (NACK); and
        the second signal is a new signal in response to the total number of transmissions of the first signal exceeding the threshold value regardless of the contents of the first HARQ feedback signal.

2. The method of claim 1, wherein each of the first signal and the second signal comprises a scheduling assignment (SA) and groupcast data.

3. The method of claim 1, wherein the second signal comprises new data.

4. The method of claim 1, wherein the second signal comprises data in the first signal.

5. The method of claim 1, wherein detecting the first HARQ feedback signal further comprises detecting the first HARQ feedback signal on HARQ feedback resource(s) shared by some UEs all UEs of the group of UEs.

6. The method of claim 1, wherein detecting the first HARQ feedback signal further comprises detecting the first HARQ feedback signal on HARQ feedback resource(s) owned by one UE of the group of UEs.

7. The method of claim 1, wherein the second signal is transmitted toward one or more UEs within coverage of a first beam of the group of UEs.

8. The method of claim 7, wherein the first HARQ feedback signal comprises an accumulation of signal(s) from the one or more UEs within coverage of the first beam of the group of UEs.

9. The method of claim 1, wherein the first HARQ feedback signal comprises one or more NACK from the one or more UEs within the group of UEs, demodulation reference signal, or a combination thereof.

\* \* \* \* \*